July 30, 1963  J. G. LEIMBACH  3,099,140
REFRIGERATION SYSTEM AND CONTROL
Filed Feb. 20, 1961  2 Sheets-Sheet 2

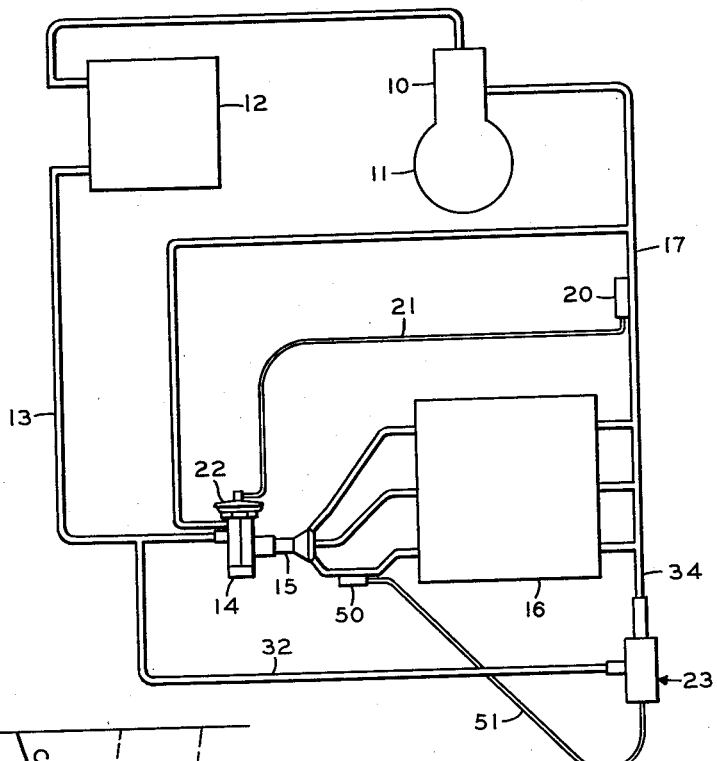
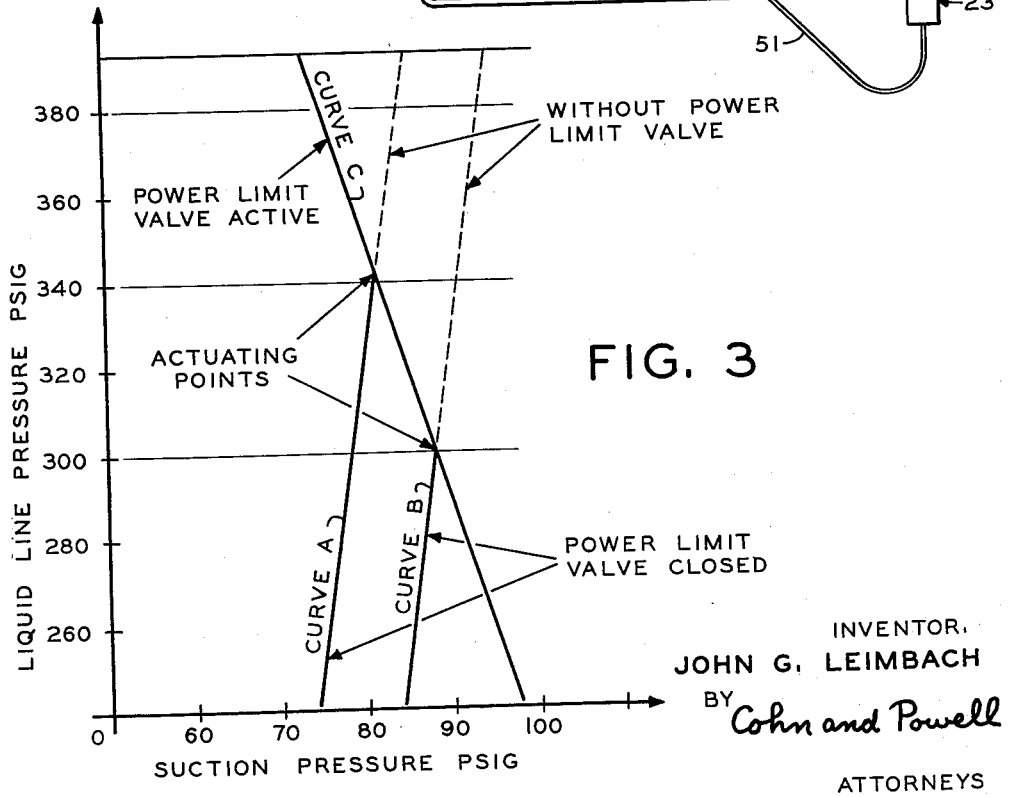

INVENTOR
JOHN G. LEIMBACH
BY Cohn and Powell
ATTORNEYS

3,099,140
REFRIGERATION SYSTEM AND CONTROL
John G. Leimbach, Crestwood, Mo., assignor to Sporlan Valve Company, St. Louis, Mo., a corporation of Missouri
Filed Feb. 20, 1961, Ser. No. 90,266
9 Claims. (Cl. 62—197)

This invention relates generally to improvements in a refrigeration system and control, and more particularly to an improved mechanism for limiting the load on the compressor motor of a refrigeration or cooling system and for cooling the refrigerant vapor returning to the compressor.

In the conventional air-conditioning system, the power input reaches a peak value during the relatively short periods of initial start-up or during unusually hot weather. In order to accommodate the compressor power requirements during these short or infrequent periods, it has been necessary to provide a larger size electric motor and refrigerant condenser than is required by normal running conditions.

It is an important objective of the present invention to provide a control device in a system of compressor-condenser-evaporator type which regulates and limits the power consumption of the compressor motor. The control device limits the electrical power input to the compressor motor at a predetermined maximum value which is chosen to permit full capacity under normal conditions but to prevent excessive power from being drawn during the less frequent high load conditions at the expense of some loss in capacity.

For any given air-conditioning system, the compressor power requirement is primarily governed by the value of the suction pressure and to a lesser degree by the value of the discharge pressure, the discharge pressure differing from the liquid line pressure by a fairly constant value. The power input to the compressor motor may therefore be reduced by decreasing either the liquid line pressure or the suction pressure.

An important object is achieved by the provision of a control valve, hereinafter designated a power limit valve, which is sensitive to both liquid line pressure and to suction pressure in operating automatically to limit the electrical power input to the compressor to a predetermined maximum value. The power limit valve permits only a given value of suction pressure depending on the liquid line pressure prevailing in order to maintain the predetermined maximum limit on the compressor motor load.

In many refrigeration systems of this type a thermostatic expansion valve is utilized to regulate the flow of refrigerant to the evaporator, the thermostatic expansion valve being actuated by a thermo-sensing bulb located in thermal responsive relation to the suction line at the evaporator outlet.

An important object is to provide a power limit valve that is actuated in response to an increase in liquid line pressure or an increase in suction pressure in the system to cause the expansion valve to limit flow of refrigerant to the evaporator by affecting the temperature of the thermostatic expansion valve sensing bulb.

Still another important objective is achieved in that the power limit valve permits the expansion valve to regulate the superheat at the compressor inlet so that it never becomes excessively high. More specifically, while the power limit valve is limiting the compressor motor load by partially starving the flow of refrigerant to the evaporator, it simultaneously desuperheats the suction gas by cooling the vapor at the comprossor inlet with the addition of expanded refrigerant into the suction line, thereby maintaining the required cool temperature of the compressor motor.

Yet another important object is achieved by providing a motor means for the power limit valve which includes a pair of bellows operatively interconnected to the valve member and a sensing bulb charged with an inert gas located in thermosensing relation to the suction line. The one bellows is subjected to a pressure differential of liquid line pressure and bulb charge pressure while the other bellows is subjected to a pressure differential of liquid line pressure and suction line pressure. These bellows are proportionately sized in effective area so that the valve member moves to regulate flow through the valve in response to either an increase in liquid line pressure or suction pressure when the predetermined maximum power input to the compressor is reached. The power limit valve is located in a by-pass line interconnecting the liquid line with the suction line at the evaporator outlet.

Another important object is achieved by the novel structure of the valve mechanism in the control device and by the provision of the control device as an article of manufacture.

It is an important objective to provide a control device in a refrigeration system that is simple and durable in construction, efficient in operation, economical to manufacture and assemble, fully automatic in operation and which can be quickly and easily installed.

The foregoing and numerous other objects and advantages of the invention will more clearly appear from the following detailed description of a power limit device and the system in which it is installed, particularly when considered in connection with the accompanying drawings, in which:

FIG. 1 is a diagrammatic view of a refrigeration system utilizing the present control device;

FIG. 3 is a performance graph illustrating a typical operating characteristic of the power limit valve.

Figure 2:
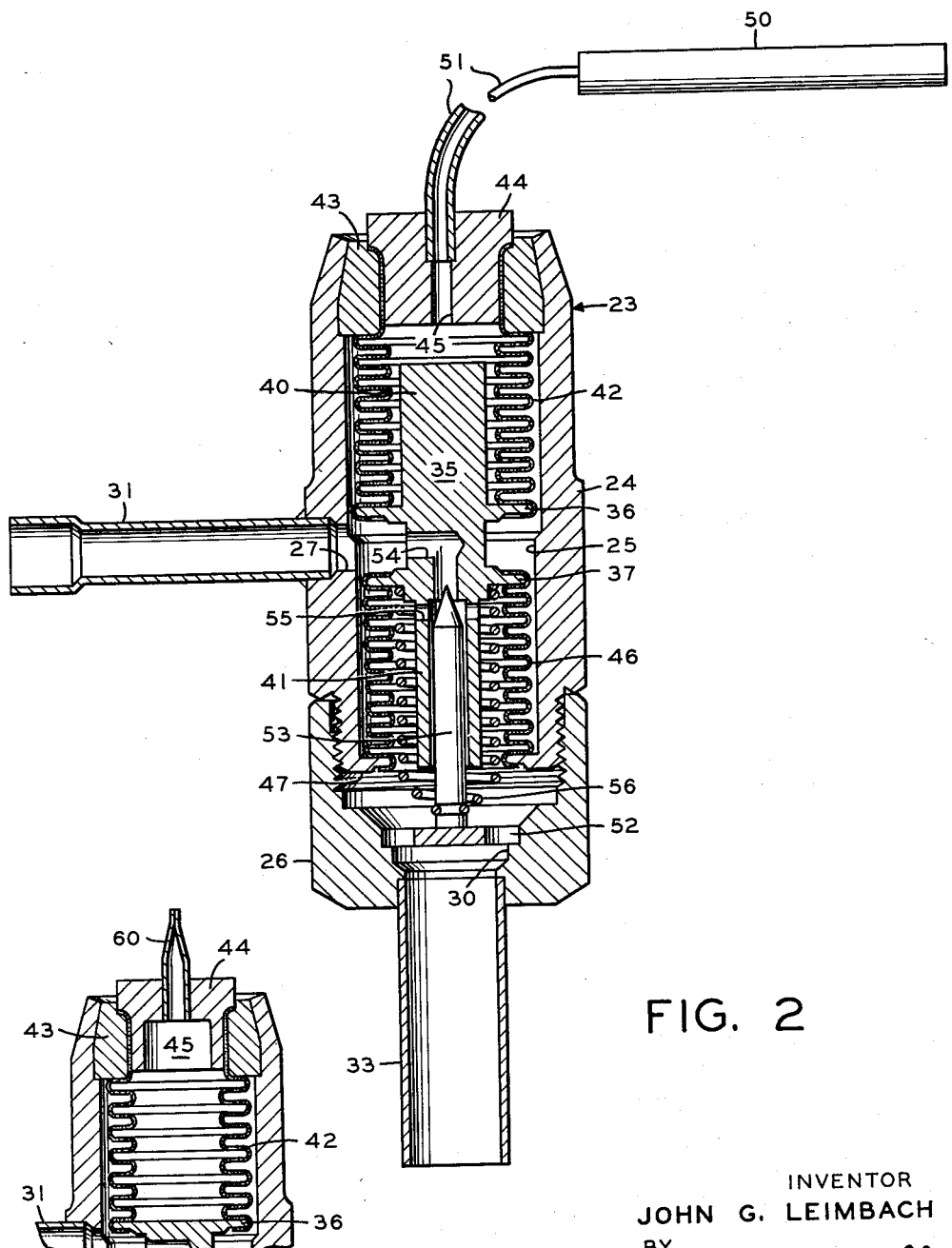
FIG. 2 is a cross sectional view of an embodiment of the control device as seen in a vertical plane.

Referring now by characters of reference to the drawings, and first to FIG. 1, it is seen that the control device is utilized in a refrigeration system of compressor-condenser-evaporator type. More particularly, the refrigeration system includes a compressor 10 driven by an electrical motor 11, the compressor 10 being operatively connected by a line to a condenser 12. The outlet of condenser 12 is connected by a liquid line 13 to the inlet of a thermostatic expansion valve 14. The outlet of thermostatic expansion valve 14 is connected to a conventional refrigerant distributor 15 of pressure type. The distributor 15 feeds refrigerant to a multi-circuit evaporator 16. In this embodiment, the evaporator 16 includes three parallel circuits with one outlet header. The outlet of evaporator 16 is connected by a suction line 17 back to the compressor 10.

The thermostatic expansion 14 is of conventional construction and is a unit of this type sold by Sporlan Valve Company of St. Louis, Missouri. This expansion valve 14 has been fully and adequately described in many prior patents owned by this company including U.S. Patent No. 2,922,292 issued January 26, 1960, and entitled "Valve Assembly for a Refrigeration System."

As is usual, the thermostatic expansion valve 14 includes a thermo-sensing bulb 20 located in adjacent thermal responsive relation to the suction line 17 at the outlet of the evaporator 16. The bulb 20 is connected by a capillary tubing 21 to a motor unit generally referred to at 22 of the thermostatic expansion valve 14.

A fluid charge is introduced into bulb 20, and consists preferably of a fluid having characteristics approaching or identical with those of the refrigerant employed in the system, and will usually consist of dichlorodifluoromethane, monochlorodifluoromethane, methyl chloride or any other of the refrigerants selected for the system according to the preference and field of usage.

The motor unit 22 of the thermostatic expansion valve 14 operates under the influence of fluid pressure changes occurring by reason of thermal effects imparted to the bulb 20 in response to changes in superheat in the suction line 17. Upon a decrease in superheat, the bulb 20 will cause the motor unit 22 to throttle or limit refrigerant flow through the thermostatic expansion valve 14, and hence limit the refrigerant flow to the evaporator 16.

A power limit valve referred to at 23 is placed in this system as is disclosed in FIG. 1 in order to limit the load on the compressor motor 11 and, if desired, to cool the refrigerant vapor returning to the compressor 10. The construction of the power limit valve 23 is best illustrated in FIG. 2.

The power limit valve 23 includes a body 24 in which a chamber 25 is formed. One end of valve body 24 is threaded to receive a nut 26. The side wall of valve body 24 is provided with an inlet port 27 communicating with chamber 25. Formed through the center of valve body nut 26 is an outlet port 30 that is also in communication with the body chamber 25.

An inlet fitting 31 is attached to valve body 24 and communicates with the valve inlet port 27. A refrigerant line 32 (FIG. 1) interconnects the liquid line 13 with the inlet fitting 31. Similarly, an outlet fitting 33 is attached to body nut 26 and communicates with the outlet port 30. Another refrigerant line 34 (FIG. 1) interconnects the outlet fitting 33 with the suction line 17 at the evaporator outlet ahead of the thermostatic expansion valve bulb 20.

Reciprocally mounted within the valve chamber 25 is an elongate center piece 35. Formed integrally with the center piece 35 and located in spaced relation substantially at the center of such piece 35, are a pair of collars 36 and 37. It will be noted that the collars 36 and 37 are located substantially on opposite sides of the inlet port 27.

The center piece 35 includes a solid boss portion 40 at one end extending from collar 36. Extending from collar 37 at the opposite end of center piece 35 is a tubular guide sleeve 41, the purpose and function of which will be later described in detail.

The motor means for actuating the power limit valve includes a first bellows 42 constituting a flexible motor element which is located within the valve chamber 25. One end of the first bellows 42 is attached to the collar 36 while the opposite end is retained or fixed to valve body 24 at one side of the inlet port 27. More particularly, the first bellows 42 is located about the end boss portion 40 of center piece 35 and is fixed to the valve body 24 by a press-fit between ring 43 and plug 44 closing one end of the valve body 24. For reasons which will later appear, the plug 44 is provided with a center passage 45 that communicated with the interior of first bellows 42.

A second bellows 46 is disposed within the valve chamber 25 and is located about the tubular guide sleeve 41. One end of second bellows 46 is attached to collar 37 of center piece 35 while the opposite end is attached to an inturned flange 47 formed at the other end of valve body 24 at the opposite side of the inlet port 27.

With the above described structural arrangement, it will be apparent that the external side of each of the bellows 42 and 46 communicates with the inlet port 27, and consequently are subjected to liquid line pressure.

The power limit valve includes a sensing bulb 50 that is connected by a capillary tubing 51 to plug passage 45, and hence is placed in direct communication with the interior of the first bellows 42. The sensing bulb 50 is charged with an inert gas so that the interior of the first bellows 42 is subjected to the charge pressure.

Although a confined air charge is preferably utilized in the system, it will be understood that any inert gas such as nitrogen, carbon dioxide or the like may be substituted with similar results in performance. The relative size of sensing bulb 50 and first bellows 42 is such that most of the air charge is contained in bulb 50.

In the system shown in FIG. 1, the sensing bulb 50 is located in thermal responsive relation to the suction line at the evaporator inlet down-stream from the refrigerant distributor 15. The air charge pressure will therefore vary slightly as the bulb temperature varies with suction pressure and temperature, but will vary in direct relationship with the suction pressure.

The interior of second bellows 46 communicates directly with the outlet port 30 and therefore is subjected to suction pressure.

Retained by body nut 26 is a perforated plate 52 extending across the valve outlet port 30. One end of a valve pin 53 seats on perforated plate 52, the pin 53 extending upwardly within the tubular guide sleeve 41 of center piece 35. The opposite end of valve pin 53 is tapered and normally interfits a valve port 54 formed in center piece 35. More particularly, the valve port 54 is formed in center piece 35 between collars 36 and 37 to communicate with body chamber 25, and opens into the interior of guide sleeve 41.

Under normal running conditions of the system, the valve pin 53 seats in the valve port 54 to stop any flow of refrigerant through the power limit valve 23. In order to place the valve port 54 in communication with the valve outlet port 30, the guide sleeve 41 is provided with a plurality of side apertures 55 which permit the flow of refrigerant from the valve port 54 into the interior of second bellows 46, then through the perforated plate 52, and thence through the valve body outlet port 30.

A compression spring 56 is located within the second bellows 46 and located around the guide sleeve 41. One end of compression spring 56 is attached to the valve pin 53 while the other end abuts collar 37 on the center piece 35. The spring 56 tends to urge the pin 53 against the perforated plate 52 and thereby hold the pin 53 in fixed relation to the valve body 24. At the same time, the spring 56 tends to urge the center piece 35 in a direction so that the valve port 54 is opened by the relative movement of the pin 53 within the guide sleeve 41.

The bellows 42 and 46 are proportionately sized in effective area so that the center piece 35 moves to regulate flow through the valve 23 in response to an increase in suction pressure and/or liquid line pressure when the maximum power input to the compressor is reached. It is therefore possible to size the bellows areas so that each value of liquid line pressure will produce the desired value of suction pressure resulting in approximately a constant maximum limit of compressor power input. The sizing of bellows 42 and 46 is made to correspond with the known operating characteristics of the system in which the power limit valve is utilized.

Specifically, in the embodiment shown the first bellows 42 is larger in area than the second bellows 46.

It is thought that the operation and functional advantages of the power limit valve have become fully apparent from the foregoing detailed description of parts, but for completeness of disclosure, the operational characteristics of the refrigeration system will be briefly described.

When the system operates under conditions which would not impose excessive load on the compressor motor, the power limit valve 23 is inactive. The combined force from the liquid line pressure and suction pressure on their respective bellows areas, in addition to the spring pressure, is then insufficient to overcome the force from the air charge pressure exerted on the interior of first bellows 42. Therefore, the power limit valve remains closed and inactive.

If the operating conditions, for any reason, change to a point where the maximum predetermined power input to the compressor motor is reached, as is caused by an increase in suction pressure and/or liquid line pressure, then the combined forces from spring 56, suction pressure on second bellows 46, and the differential of liquid line pressure exerted on the two bellows 42 and 46 of unequal sizes, begin to overcome the force from the air charge pressure within the first bellows 42, thereby resulting in the opening of power limit valve 23. The bellows 42 and 46 move the center piece 35 in a direction so that valve pin 53 opens valve port 54.

Liquid refrigerant is then fed from the liquid line 13 to the power limit valve 23, is expanded through the valve port 54 and fed to the suction line 17 at a point ahead of the thermostatic expansion valve bulb 20. This injection of expanded refrigerant by the power limit valve produces a cooling effect on the thermostatic expansion valve bulb 20, which in turn tends to close the thermostatic expansion valve 14. As the thermostatic expansion valve 14 closes or throttles, the suction pressure is lowered and the compressor load is reduced until the maximum load limit is no longer exceeded.

For such conditions, a modulating action of the power limit valve 23 will result as it will pass only sufficient liquid refrigerant into the suction line 17 to prevent the compressor load from exceeding the maximum limit.

The performance graph shown in FIG. 3 illustrates a typical operating characteristic of the power limit valve although it will be understood that the values given may only apply to the type of system to which they refer. Curves A and B are plotted with values of liquid line pressure on the vertical axis and with suction pressure on the horizontal axis of the graph. Curves A and B represent different evaporator loads, and particularly, the load represented by curve B is larger than that represented by curve A.

Curve C illustrated in FIG. 3 is plotted with values of liquid line pressure and suction pressure which provide a predetermined maximum power input to the compressor. In other words, curve C applies for any evaporator load and coincides approximately with a curve of constant power input to the compressor.

When the air-conditioning system is operating under either of the evaporator loads indicated by curves A or B, the system will operate normally upon increase in liquid line pressure and suction pressure, and the power limit valve will remain closed or inactive, until an increase in either liquid line pressure or suction pressure causes an increase in the power input to the compressor motor to reach a predetermined maximum value. These actuating points are indicated in FIG. 3 where curves A and B intersect curve C.

When the electrical power input to the compressor motor begins to exceed the predetermined maximum value, the power limit valve will open as previously described to admit expanded refrigerant to the suction line. From the graph of FIG. 3 it will be readily apparent that as the liquid line pressure increases above the actuating points, the suction pressure is decreased by the operation of the power limit valve so that the value of the suction pressure follows curve C, thereby preventing the compressor load from exceeding the maximum limit.

Curves A and B are extended above the actuating points in dotted lines to indicate the values of the liquid line pressure and suction pressure existing in the system if the power limit valve were not operating. It is clear that if these values of liquid line pressure and suction pressure represented by the dotted portions of curves A and B did exist in the system, that the load on the compressor motor would be greatly increased over any desired limit.

The preceding description explains the action of the valve 23 which actually over-compensates. This means that the valve 23 will actually reduce the evaporator pressure upon an increase in liquid line pressure.

For example, take a point on the suction line pressure curve A at 340 lbs. liquid line pressure, corresponding to 84 lbs. suction pressure. If the liquid line pressure tended to increase because of high temperatures surrounding the condenser beyond 340 lbs., the control valve 23 would act to reduce the suction pressure a calculated amount, which would provide a suction pressure of say only 80 lbs. at 360 lbs. head pressure. This decrease in suction pressure would probably result in a decrease in liquid line pressure and a new balance might result at say 350 lbs. head pressure and 82 lbs. suction pressure.

If the evaporator load on the compressor 10 were greater, as shown in curve B, then a lower maximum head pressure would be permitted such as 300 lbs. at 90 lbs. suction pressure.

A drop in suction pressure would ordinarily be accompanied by a drop in liquid line pressure provided there were no control valve 23 and provided there were no changes in air temperature or flow at the condenser 12. With control valve 23, a drop in suction pressure for any reason would permit a higher maximum liquid line pressure but would not cause it. Other factors would have to cause the increase in liquid line pressure, such as a higher air temperature over the condenser 12.

With a constant evaporator load, curves A and B (including the dotted extensions), show that for a certain refrigerating plant the suction pressure rises a certain amount with the head pressure. This is caused by the reduced volumetric efficiency of the compressor at higher differential temperatures. Without the power limit valve 23, such increases in head pressure would result in increases in suction pressure along the dotted lines and the motor load would be exceeded. With the power limit valve 23, the suction pressure is reduced by cooling the extension valve bulb 20 and starving the evaporator 16 of refrigerant, thus reducing the suction pressure. This would be done upon an increase in head pressure and would result in performance along curve C above the actuating points. This action would maintain the motor load at a point which is safe rather than allowing it to increase along the dotted lines.

Figure 4:
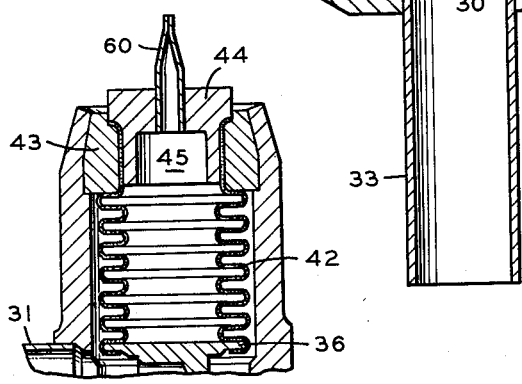
FIG. 4 is a fragmentary cross sectional view of the control device similar to FIG. 2, but illustrating a modification.

FIG. 4 illustrates a modified construction of the control valve. It will be noted that the bellows 42 is charged with an inert gas such as air through the short tube 60. After charging, the tube 60 is sealed off. It will be noted that this embodiment of the control valve does not utilize a sensing bulb of the type indicated at 50 in FIG. 2. However, the volume of the air charge within the bellows 42 is increased by removing the boss 40 of the center piece 35 and by recessing the lower end of plug 44.

The operation of the control valve disclosed in FIG. 4 is exactly the same as that disclosed in FIG. 2, although the embodiment of FIG. 2 does operate in the system more satisfactorily, and therefore the preferred construction.

Although the invention has been described by making detailed reference to a single preferred embodiment, such detailed reference is to be understood in an instructive, rather than detail is to be understood in an instructive, rather than in any restrictive sense, many variants being possible within the scope of the claims hereunto appended.

I claim as my invention:

1. In a refrigeration system, a compressor, a condenser connected to said compressor, a liquid line leading from said condenser, an evaporator, means in said liquid line for delivering expanded refrigerant to said evaporator, a suction line connecting said evaporator to said compressor, a last said means including a bulb located in thermal sensing relation to the suction line at the evaporator outlet for controlling flow to said evaporator, a by-pass line interconnecting the liquid line with the suction line ahead of the last said bulb, a valve in said by-pass line for controlling flow therethrough, and a motor means operatively connected to said valve to control operation of said valve, the motor means including a first and a second flexible motor element, means subjecting one side of said first and second flexible elements to liquid line pressure, a second sensing bulb charged with an inert gas communicating with the other side of the first flexible element, said second bulb being located in thermal sensing relation to the inlet of said evaporator, means subjecting the other side of the second flexible element to suction line pressure, the first and second flexible motor elements regulating flow through the valve in response to liquid line or suction line pressures so that the power input of the compressor does not exceed a predetermined maximum value.

2. In a refrigeration system, a compressor, a condenser connected to said compressor, a liquid line leading from said condenser, an evaporator, a thermostatic expansion valve in said liquid line for delivering expanded refrigerant to said evaporator, said thermostatic expansion valve including a sensing bulb located in thermal sensing relation to the outlet of said evaporator for regulating flow through said thermostatic expansion valve, a suction line connecting said evaporator to said compressor, a by-pass line interconnecting the liquid line ahead of said thermostatic expansion valve to the suction line ahead of the thermostatic expansion valve bulb, a power limit valve in said by-pass line, a motor means operatively connected to said power limit valve for controlling flow therethrough, said motor means including a first flexible element, means subjecting one side of said first flexible element to liquid line pressure, a limit valve bulb disposed in thermal relation to said suction line at the inlet to said evaporator, means communicating the limit valve bulb with the other side of said first flexible element, said limit valve bulb being charged with an inert gas and subjecting the said other side of the first flexible element to the charge pressure, a second flexible element, means subjecting one side of said second flexible element to liquid line pressure, means subjecting the other side of said second flexible element to suction line pressure, and means interconnecting said first and second flexible motor elements to regulate flow through said power limit valve in response to liquid line or suction line pressures so that the power input of the compressor does not exceed a predetermined maximum value.

3. In a refrigeration system, a compressor, a condenser connected to said compressor, a liquid line leading from said condenser, an evaporator, means in said liquid line for delivering expanded refrigerant to said evaporator, a suction line connecting said evaporator to said compressor, the last said means including a first bulb located in thermal sensing relation to the suction line at the evaporator outlet for regulating flow through said means, a valve including a body having an inlet and an outlet interconnected by a passage, a line connecting the valve inlet to the liquid line, another line connecting the valve outlet to the suction line ahead of said first bulb, and a motor means including a first and a second flexible motor element, a valve member interconnecting said flexible motor elements and movable therewith, one side of said first and second flexible elements communicating with the valve inlet and being subjected to liquid line pressure, a second sensing bulb charged with an inert gas communicating with the other side of said first flexible element, said second bulb being located in thermal sensing relation to the inlet of said evaporator, the other side of said second flexible element communicating with the valve outlet and being subjected to suction line pressure, said first and second flexible motor elements regulating flow through the valve in response to liquid line or suction line pressures so that the power input of the compressor does not exceed a predetermined maximum value.

4. In a refrigeration system, a compressor, a condenser connected to said compressor, a liquid line leading from said condenser, an evaporator, means in said liquid line for delivering expanded refrigerant to said evaporator, a suction line connecting said evaporator to said compressor, the last said means including a first bulb located in thermal sensing relation to the suction line at the evaporator outlet for regulating flow through said means, a by-pass line interconnecting the liquid line to said suction line ahead of said first bulb, a power limit valve in said by-pass line, a motor means including a first and a second flexible motor element, a valve member interconnecting said flexible motor elements, a second sensing bulb charged with an inert gas located in thermal sensing relation to the suction line, means subjecting said first flexible element to a pressure differential of liquid line pressure and the charge pressure that varies directly with suction line pressure, means subjecting the second flexible element to a pressure differential of liquid line pressure and suction line pressure, said first and second flexible motor elements actuating the valve member toward an open position upon an increase in either liquid line pressure or suction line pressure when a predetermined maximum power input to the compressor is reached so that the power input of the compressor does not exceed such predetermined maximum value.

5. In a refrigeration system, a compressor, a condenser connected to said compressor, a liquid line leading from said condenser, an evaporator, a thermostatic expansion valve in said liquid line for delivering expanded refrigerant to said evaporator, a suction line connecting said evaporator to said compressor, said thermostatic expansion valve including a bulb located in thermal sensing relation to the suction line at the evaporator outlet for controlling flow through said valve, a power limit valve including a body having an inlet and an outlet interconnected by a passage, a line connecting the valve inlet to the liquid line ahead of said thermostatic expansion valve, another line connecting the valve outlet to the suction line at the evaporator outlet ahead of the bulb for thermostatic expansion valve, a motor means including a first and a second flexible motor element in said body, a valve member in said body interconnecting said flexible motor elements and movable therewith, one side of said first and second flexible motor elements communicating with the valve inlet and being subjected to liquid line pressure, a power limit sensing bulb charged with an inert gas communicating with the other side of said first flexible element, said power limit bulb being located in thermal sensing relation to the inlet of said evaporator downstream from the thermostatic expansion valve, the other side of said second flexible motor element communicating with the valve outlet and being subjected to suction line pressure, the first flexible motor element being proportionately sized larger in effective area than the second flexible motor element so that the valve member moves toward an open position upon an increase in either liquid line pressure or suction line pressure when a predetermined maximum power input to the compressor is reached, whereby to pass sufficient liquid into the suction line to prevent the compressor load from exceeding the maximum limit.

6. In a refrigeration system, a compressor, a condenser connected to said compressor, a liquid line leading from said condenser, an evaporator, means in said liquid line for delivering expanded refrigerant to said evaporator, a suction line connecting said evaporator to said compressor, the last said means including a first bulb located in thermal sensing relation to the suction line at the evaporator outlet for regulating flow through said means, a valve including a body having a chamber, the body being provided with an inlet and outlet to said chamber, a line connecting the valve inlet to the liquid line, another line connecting the valve outlet to the suction line ahead of said first bulb, and a motor means including a center piece reciprocally mounted in said chamber, a first bellows attached to said center piece and to said body on one side of said valve inlet, a second bellows attached to said center piece and to said body on the other side of said valve inlet, said first and second bellows being subjected externally to liquid line pressure through said valve inlet, a second sensing bulb disposed in thermal sensing relation to said suction line and communicating with the interior of said first bellows, said second bulb being charged with an inert gas and subjecting the first bellows internally to the charge pressure, the interior of said second bellows being subjected to suction line pressure, a valve means carried by said center piece for regulating flow from the valve inlet to the valve outlet, said first and second bellows actuating said valve member by said center piece to regulate flow through the valve in response to liquid line or suction line pressures so that the power input of the compressor does not exceed a predetermined maximum value.

7. In a refrigeration system, a compressor, a condenser connected to said compressor, a liquid line leading from said condenser, an evaporator, means in said liquid line for delivering expanded refrigerant to said evaporator, a suction line connecting said evaporator to said compressor, the last said means including a first bulb located in thermal sensing relation to the suction line at the evaporator outlet for regulating flow through said means, a valve including a body having a chamber, the body being provided with an inlet and outlet to said chamber, a line connecting the valve inlet to the liquid line, another line connecting the valve outlet to the suction line ahead of said first bulb, and a motor means including a center piece reciprocally mounted in said chamber, a first bellows attached to said center piece and to said body on one side of said valve inlet, a second bellows attached to said center piece and to said body on the other side of said valve inlet, the said bellows being subjected externally to liquid line pressure through said valve inlet, a second sensing bulb disposed in thermal relation to said suction line and communicating with the interior of said first bellows, said second bulb being charged with an inert gas and subjecting the interior of said first bellows to the charge pressure, the second bellows having its interior in communication with the valve outlet and being subjected to suction line pressure, the center piece being provided with a tubular guide sleeve in the interior of said second bellows, the center piece being provided with a valve port communicating the valve inlet with the interior of said tubular guide sleeve, said sleeve being provided with at least one aperture to place the interior of said sleeve in communication with the interior of said second bellows, a perforated plate attached to said body and extending across said valve outlet, a valve pin disposed within said sleeve and having one end normally seating in said valve port, a compression spring located within said second bellows, one end of said spring engaging the center piece and the other end engaging the pin tending to urge the pin against the perforated plate, said bellows actuating the center piece to open said valve port in response to an increase in either liquid line pressure or suction line pressure when a maximum predetermined power input to the compressor is reached.

8. In a refrigeration system, a compressor, a condenser connected to said compressor, a liquid line leading from said condenser, an evaporator, a thermostatic expansion valve in said liquid line for delivering expanded refrigerant to said evaporator, a suction line connecting said evaporator to said compressor, said thermostatic expansion valve including a sensing bulb located in thermal relation to the suction line at the evaporator outlet for regulating flow through the expansion valve, a power limit valve including a body having a chamber, the body being provided with an inlet and an outlet to said chamber, a line connecting the valve inlet to the liquid line, another line connecting the valve outlet to the suction line, a motor means including a center piece reciprocally mounted in said chamber, a first bellows attached to said center piece and to said body on one side of said valve inlet, a second bellows attached to said center piece and to said body on the other side of said valve inlet, said bellows being subjected externally to liquid line pressure through said valve inlet, a power limit sensing bulb disposed in thermal relation to said suction line at the inlet to said evaporator down-stream the thermostatic expansion valve and communicating with the interior of said first bellows, said power limit valve bulb being charged with an inert gas and subjecting the interior of said first bellows to the charge pressure, the second bellows having its interior in communication with the valve outlet and being subjected to the suction line pressure, the center piece being provided with a tubular guide sleeve in the interior of said second bellows, the center piece being provided with a valve port communicating the valve inlet with the interior of said tubular guide sleeve, said sleeve being provided with at least one aperture placing the interior of said sleeve in communication with the interior of said second bellows, a perforated plate attached to said body and disposed across said valve outlet, a valve pin disposed within said sleeve, said pin having one end normally seating in said valve port and the other end abutting said perforated plate, a compression spring located within said second bellows and surrounding the tubular guide sleeve, one end of said spring engaging the center piece and the other end engaging the pin tending to urge the pin against the plate, the first bellows being sized proportionately larger than the second bellows so that the center piece is movable to open said port upon either an increase in liquid line pressure or suction line pressure when a maximum predetermined power input to the compressor is reached, whereby sufficient liquid is passed into the suction line to prevent the compressor load from exceeding the maximum limit.

9. In a refrigeration system, a compressor, a condenser connected to said compressor, a liquid line leading from said condenser, an evaporator, means in said liquid line for delivering expanded refrigerant to said evaporator, a suction line connecting said evaporator to said compressor, the last said means including a first bulb located in thermal sensing relation to the suction line at the evaporator outlet for regulating flow through said means, a by-pass line interconnecting the liquid line with the suction line ahead of said first bulb, a valve in said by-pass line for controlling flow therethrough, and a motor means operatively connected to said valve to control operation of said valve, the motor means including first and second flexible motor elements, means subjecting one side of said first and second flexible elements to liquid line pressure, means subjecting the other side of said first flexible element to the pressure of an inert gas charge, means subjecting the other side of the second flexible element to suction line pressure, the first and second flexible motor elements regulating flow through the valve in response to liquid line or suction line pressures so that the power input of the compressor does not exceed a predetermined maximum value.

References Cited in the file of this patent
UNITED STATES PATENTS
2,972,236    Nussbaum _____ Feb. 21, 1961